US007774527B2

(12) United States Patent
Kim et al.

(10) Patent No.: US 7,774,527 B2
(45) Date of Patent: Aug. 10, 2010

(54) APPARATUS AND METHOD FOR CONTROLLING NUMEROUS SLAVE DEVICES IN AN INTEGRATED MANNER

(75) Inventors: Hyo-dae Kim, Suwon-si (KR); Yong-jun Kim, Yongin-si (KR); Jong-wook Park, Seoul (KR); Yu-seong Jeon, Suwon-si (KR); Young-mi Kang, Yongin-si (KR); Sung-hee Kim, Seoul (KR); Jae-kwon Kim, Suwon-si (KR); Eu-gene Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 308 days.

(21) Appl. No.: 10/913,120

(22) Filed: Aug. 6, 2004

(65) Prior Publication Data

US 2005/0033887 A1 Feb. 10, 2005

Related U.S. Application Data

(60) Provisional application No. 60/492,973, filed on Aug. 7, 2003.

(30) Foreign Application Priority Data

Aug. 7, 2003 (KR) ...................... 10-2003-0054791

(51) Int. Cl.
*G06F 13/42* (2006.01)

(52) U.S. Cl. ...................................................... 710/106

(58) Field of Classification Search ................. 709/208; 710/110, 106
See application file for complete search history.

(56) References Cited

U.S. PATENT DOCUMENTS

| | | | | |
|---|---|---|---|---|
| 4,937,818 | A * | 6/1990 | Sonetaka | 370/348 |
| 5,361,260 | A * | 11/1994 | Mito | 370/452 |
| 5,909,183 | A | 6/1999 | Borgstahl et al. | |
| 6,192,124 | B1 * | 2/2001 | Yim | 379/355.08 |
| 6,304,502 | B1 * | 10/2001 | Watanabe et al. | 365/201 |
| 6,469,751 | B1 | 10/2002 | Isobe et al. | |
| 7,027,170 | B1 * | 4/2006 | Nishikawa et al. | 358/1.15 |
| 2002/0194299 | A1 * | 12/2002 | Yasaki et al. | 709/217 |
| 2003/0030392 | A1 * | 2/2003 | Neranjan et al. | 318/34 |
| 2004/0010561 | A1 * | 1/2004 | Kim et al. | 709/208 |

(Continued)

FOREIGN PATENT DOCUMENTS

JP 03-273797 A 12/1991

(Continued)

*Primary Examiner*—Thomas Lee
*Assistant Examiner*—Mohammed H Rehman
(74) *Attorney, Agent, or Firm*—Sughrue Mion, PLLC

(57) ABSTRACT

A device for controlling in an integrated manner multiple slave devices includes a key input unit that receives a key input by a user, a state determination unit that checks state information of the slave devices, and a control unit that interprets the input key based on the state information of the slave devices and controls a concerned slave device of the slave devices. A method for controlling multiple slave devices includes receiving a key input by the user, checking state information of the slave devices existing on the network, and controlling the concerned slave device by interpreting the input key based on the state information of the slave devices.

20 Claims, 20 Drawing Sheets

U.S. PATENT DOCUMENTS

2005/0009498 A1* 1/2005 Ho et al. .................... 455/402
2005/0083173 A1* 4/2005 Konupek et al. ........... 340/5.61
2006/0077174 A1* 4/2006 Chung et al. ................ 345/156

FOREIGN PATENT DOCUMENTS

KR 2000-0021434 A 4/2000
KR 2000-0033887 A 6/2000
KR 2002-0074322 A 9/2002
KR 2002-0082845 A 10/2002
KR 2002-0050490 A 6/2005

* cited by examiner

```
UpdateDeviceStatus()
{
  for(id=id_start id < id_end; id++)
  {
        //query device status and store the return value
        //IF there is no return value, DeviceStatus is NULL
        DeviceStatus = QueryDeviceStatus(id);
        //Update the device status information
        Device[id].Status = DeviceStatus;
  }
}
```

FIG. 7B

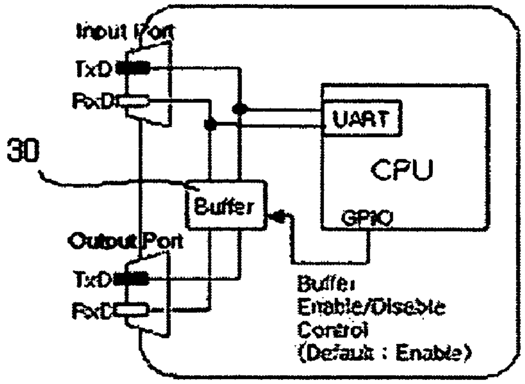

SEPARATE HARDWARE LOGIC FOR RS-232C

2

```
DiscoveryAddressDevice()
{
        MessageFromDevice=TRUE;
        Broadcast to all device to disable the control buffer and clear all device ID
        While(MessageFromDevice==FALSE) do
        {
                Send WhoAreYou Packet to device        (A)
                if(Receive WhoIAm Packet)              (B)
                {
                        Generate new device ID and send it to device
                        Register the device ID
                        (The device will enable the buffer)
                }
                else
                {
                        MessageFromDevice = FALSE
                }
        }
}
```

FIG. 7C

```
UpdateDeviceStatus()
{
  for(id=id_start id < id_end: id++)
  {,
        //query device status and store the return value
        DeviceStatus = QueryDeviceStatus(id);
        //IF there is no return value, DeviceStatus is NULL
        If(DeviceStatus == NULL)
        {
              remove the device ID
        }
        else
        {
              //update the device status information
              Device[id].Status = DeviceStatus:
        }
  }
}
```

3

```
PlugDetection()
{
        For all slaves S
        {
                Send MSG_GET_PLUG_TYPE to S
                Receive response message from S
        }

        For all source or combo devices S
        {
                For all source or combo devices T except S
                {
                        Send MSG_SIG_OFF to T;
                }
                Send MSG_SIG_ON to S;
                For all sink or combo devices U except S
                {
                        Send MSG_DETECT_SIG_INPUT to U;
                        Receive response message from U
                }
        }
}
```

FIG. 9A

| Inputted key code | Control instructions in each of equipment states | Subject of control |
|---|---|---|
| Power supply | POWER | Combo retransmission |
| When continuous key is inputted | COMBOR_POWER AVR_POWER STBR_POWER POWER | 1. Combo AVR STB retransmission 2. TV UI |
| DTV+ | Not supported in this mode | Return |
| Preference channel | Not supported in this mode | Return |
| Equipment selection | Not supported in this mode | Return |
| Number<br>In case that TV OSD is not existed | COMBOR_NUM_0 | Combo retransmission |
| | COMBOR_NUM_1 | Combo retransmission |
| | COMBOR_NUM_2 | Combo retransmission |
| | COMBOR_NUM_3 | Combo retransmission |
| | COMBOR_NUM_4 | Combo retransmission |
| | COMBOR_NUM_5 | Combo retransmission |
| | COMBOR_NUM_6 | Combo retransmission |
| | COMBOR_NUM_7 | Combo retransmission |
| | COMBOR_NUM_8 | Combo retransmission |
| | COMBOR_NUM_9 | Combo retransmission |
| Number<br>In case that TV OSD is existed | NUM0 | TV UI |
| | NUM1 | TV UI |
| | NUM2 | TV UI |
| | NUM3 | TV UI |
| | NUM4 | TV UI |
| | NUM5 | TV UI |
| | NUM6 | TV UI |
| | NUM7 | TV UI |
| | NUM8 | TV UI |
| | NUM9 | TV UI |
| Mute | MUTE | TV UI |
| | AVROR_AUDIO_MUTE | AVR retransmission |
| Volume (same when continuous key is inputted) | VOL_UP(when listening with TV set) | TV UI |
| | VOL_UP(when listening with TV set) | TV UI |
| | AVROR_VOLUME_UP | AVR retransmission |
| | AVROR_VOLUME_DOWN | AVR retransmission |
| When channel TV OSD is not existed | COMBOR_CHANNEL_UP | Combo retransmission |
| | COMBOR_CHANNEL_DOWN | Combo retransmission |
| When channel TV OSD is not existed | CH_UP | TV UI |
| | CH_DN | TV UI |
| TV / external input | TV_VIDEO | TV UI |
| Menu | COMBOR_DISC_MENU | Combo retransmission |
| Broadcasting information | Not supported in this mode | Return |
| Information display | COMBOR_INFO_DISPLAY | Combo retransmission |
| End | COMBOR_RETURN | Combo retransmission |
| End (OSD menu is existed) | EXIT | TV UI |
| Four directions/ selection (same when continuous key is inputted) | COMBOR_CURSOR_UP | Combo retransmission |
| | COMBOR_CURSOR_DOWN | Combo retransmission |
| | COMBOR_CURSOR_RIGHT | Combo retransmission |
| | COMBOR_CURSOR_LEFT | Combo retransmission |
| | COMBOR_ENTER | Combo retransmission |
| Four directions/ selection<br>When TV OSD menu is displayed | CURSOR_UP | TV UI |
| | CURSOR_DOWN | TV UI |
| | CURSOR_RIGHT | TV UI |
| | CURSOR_LEFT | TV UI |
| | ENTER | TV UI |
| Screen mode | PSM | TV UI |
| Still screen | STILL_PIC | TV UI |
| Screen size | ARC | TV UI |
| Surround | DOLBY | TV UI |
| Automatic channel | Not supported in this mode | Return |
| Memory/delete | Not supported in this mode | Return |
| Multi-sound | Not supported in this mode | Return |
| Replay concerned | COMBOR_BACK_REW | Combo retransmission |
| | COMBOR_STOP | Combo retransmission |
| | COMBOR_PLAY_PAUSE | Combo retransmission |
| | COMBOR_FOR_FF | Combo retransmission |

FIG. 9B

| Inputted key code | Control instruction in each of equipment states | Subject of control |
|---|---|---|
| Power supply | POWER | STB retransmission |
| When continuous key is inputted | COMBOR_POWER AVR_POWER STBR_POWER POWER | 1. Combo AVR STB retransmission<br>2. TV UI |
| Preference channel | Not supported in this mode | Return |
| Equipment selection | Not supported in this mode | Return |
| Number | STBR_NUM_0 | STB retransmission |
| | STBR_NUM_1 | STB retransmission |
| | STBR_NUM_2 | STB retransmission |
| | STBR_NUM_3 | STB retransmission |
| | STBR_NUM_4 | STB retransmission |
| | STBR_NUM_5 | STB retransmission |
| | STBR_NUM_6 | STB retransmission |
| | STBR_NUM_7 | STB retransmission |
| | STBR_NUM_8 | STB retransmission |
| | STBR_NUM_9 | STB retransmission |
| Mute | MUTE | TV UI |
| | AVRCR_AUDIO_MUTE | AVR retransmission |
| Volume (same when continuous key is inputted) | VOL_UP(when listening with TV) | TV UI |
| | VOL_UP(when listening with TV) | TV UI |
| | AVRCR_VOLUME_UP | AVR retransmission |
| | AVRCR_VOLUME_DOWN | AVR retransmission |
| channel | STBR_CHANNEL_UP | STB retransmission |
| | STBR_CHANNEL_DOWN | STB retransmission |
| TV / external input | Not supported in this mode | Return |
| Menu | STBR_MENU | STB retransmission |
| Broadcasting information | Not supported in this mode | Return |
| Information display | STBR_INFO_DISPLAY | STB retransmission |
| End | Not supported in this mode | Return |
| End (OSD menu is existed) | EXIT | TV UI |
| Four directions/ selection (same when continuous key is inputted) | STBR_CURSOR_UP | STB retransmission |
| | STBR_CURSOR_DOWN | STB retransmission |
| | STBR_CURSOR_RIGHT | STB retransmission |
| | STBR_CURSOR_LEFT | STB retransmission |
| | STBR_ENTER | STB retransmission |
| Four directions/ selection (When TV OSD menu is displayed) | CURSOR_UP | TV UI |
| | CURSOR_DOWN | TV UI |
| | CURSOR_RIGHT | TV UI |
| | CURSOR_LEFT | TV UI |
| | ENTER | TV UI |
| Screen mode | PSM(when OSD menu is On) | TV UI |
| Still screen | STILL_PIC(when OSD menu is On) | TV UI |
| Screen size | ARC(when OSD menu is On) | TV UI |
| Surround | DOLBY (when OSD menu is On) | TV UI |
| Automatic channel | Not supported in this mode | Return |
| Memory/delete | Not supported in this mode | Return |
| Multi-sound | Not supported in this mode | Return |
| Replay concerned | Not supported in this mode | Return |
| | Not supported in this mode | Return |
| | Not supported in this mode | Return |
| | Not supported in this mode | Return |

APPARATUS AND METHOD FOR CONTROLLING NUMEROUS SLAVE DEVICES IN AN INTEGRATED MANNER

CROSS-REFERENCE TO RELATED APPLICATION

This application claims priority from Korean Patent Application Nos. 10-2003-0054791 filed Aug. 7, 2003 and U.S. Provisional Patent Application No. 60/492,973 filed on Aug. 7, 2003, the whole disclosures of which are hereby incorporated herein by reference.

BACKGROUND OF THE INVENTION

1. Field of the Invention

The present invention relates in general to an apparatus and method for controlling numerous slave devices in an integrated manner, and more particularly, to an apparatus and method for integrated control of numerous slave devices wherein a concerned slave device can be controlled based on an input and state information of the slave devices.

2. Description of the Related Art

Generally two kinds of remote controls have been in use: a dedicated remote control and a universal remote control. The dedicated remote control is provided for respective devices and models. The use of the dedicated remote control is appropriate only for a device originally intended whereas the universal remote control is designed to control a plurality of devices The universal remote control includes device selection buttons and manufacturer selection buttons, and whose devices to be controlled thereby (hereinafter referred to as “slave devices”) are inherently configured in the remote control.

FIG. 1 is a view showing dedicated remote controls and slave devices in the art, wherein the dedicated remote controls should be provided for devices to be controlled.

Accordingly, a user has to manipulate a plurality of devices (for example, DTVs (digital TVs), DVDs (digital versatile disks), STBs (set-top boxes), VCRs (video cassette recorders), A/V-Receivers, and so forth) respectively using separate remote controls, and for this reason, the user is requested to manage several remote controls and learn how to use the remote controls.

FIG. 2 is a view showing a universal remote control and slave devices in the art, wherein devices to be controlled are inherently configured in the universal remote control and a user can control respective devices by changing modes of the remote control, thereby making it inconvenient to use the controlled devices.

By doing so, the user would experience any inconvenience since he or she has to change the remote control’s mode whenever necessary in order to control the corresponding device.

Also, since the universal remote control cannot control newly added to-be-slave devices except devices configured inherently for the control, a separate remote control has to be provided when a user purchases a new device.

SUMMARY OF THE INVENTION

The present invention is conceived to consider the disadvantages of the related art described above. An aspect of the present invention is to provide an apparatus and method for controlling numerous slave devices in an integrated manner, with which the concerned slave device can be controlled based on a key input by a user and state information of the slave device.

Consistent with an exemplary embodiment of the present invention, there is provided a device for controlling in an integrated manner multiple slave devices, including an input unit that receives a key input by a user; a state determination unit that checks state information of the slave devices; and a control unit that interprets the input according to the state information of the slave devices and controls a concerned slave device of the slave devices.

The control unit may control the concerned slave device based on a mapping table in which slave devices and control operations of the slave devices are determined according to state information of the slave devices and keys input, and the concerned slave device may be controlled by transmitting a control signal corresponding to a control operation stored in the mapping table to the concerned slave device by use of wireless telecommunication. The device may further comprises a recognizing unit that checks device information and connection information of the slave devices existing on the network and that allocates a device identification ID to each of the respective slave devices.

Consistent with another exemplary embodiment of the present invention, there is provided a display device for controlling multiple slave devices, including a key input unit that receives and a key input by a user; a state determination unit that checks state information of the slave devices and the display device; and a control unit that interprets the input based on the state information of the slave devices and the display device and that controls a concerned slave device of the slave devices.

The control unit may control the slave device based on a mapping table in which slave devices and control operations of the slave devices are determined according to state information of slave devices and keys input, and the concerned slave device is controlled by transmitting a control signal corresponding to a control operation stored in the mapping table to the concerned slave device by use of wireless telecommunication. The device may further comprises a recognizing unit that checks device information and connection information of the slave devices existing on the network and that allocates a device identification ID to each of the respective slave devices.

Consistent with a further exemplary embodiment of the present invention, there is provided a method for controlling multiple slave devices, including receiving a key input by a user; checking state information of the slave devices existing on a network; and controlling a concerned slave device of the slave devices by interpreting the input based on the state information of the slave devices.

The state information may include information on a signal input into a display device, and the control unit may control the concerned slave device based on a mapping table in which the slave devices and control operations of the slave devices are determined according to state information of the slave devices and keys input.

The mapping table may be generated by collecting device information of the slave devices existing on the network; collecting connection information of the slave devices based on the collected device information of the slave devices; and setting up a remote control key to be provided to the concerned slave device based on the collected device information and connection information.

The device information and connection information of the slave devices may be collected by collecting a list of the slave devices stored in a memory unit by the user, and the device information and connection information of the slave devices may be obtained by automatically collecting information on the slave devices existing on the network, by use of the recognizing unit.

Collection of the device information on the slave devices existing on the network may include transmitting to each of the slave devices existing on the network a packet to request unique identification information of each respective slave device; receiving a response packet to the request packet from a predetermined slave device that has not been allocated with a device identification ID; allocating a device identification ID to the predetermined slave device that transmitted the response packet; and collecting the device information of the slave device based on the device identification ID allocated.

Collection of the connection information between the slave devices based on the collected device information of the slave devices may comprises activating multiple slave devices sequentially; and collecting connection information of the activated slave devices, and collection of the connection information between the slave devices based on the collected device information of the slave devices may include ascertaining each slave device of the slave devices having an output plug and an input plug; sequentially activating each slave device of the slave devices having an output plug; and ascertaining each slave device of the slave devices that receives output of the activated slave devices through the input plug.

BRIEF DESCRIPTION OF THE DRAWINGS

The above and other features and advantages of the present invention will become more apparent to those of ordinary skill in the art by describing in detail the preferred embodiments thereof with reference to the attached drawings in which:

FIGS. 7A-C are views explaining a method for obtaining device information on a slave device on a recognizer unit side of FIG. 6;

FIGS. 9A and B show a mapping table in accordance with the present invention

DETAILED DESCRIPTION OF THE INVENTION

The present invention will be described more fully hereinafter with reference to the accompanying drawings, in which exemplary embodiments of the invention are illustrated. This invention may, however, be embodied in different forms and should not be construed as limited to the embodiments set fourth herein.

Figure 1:
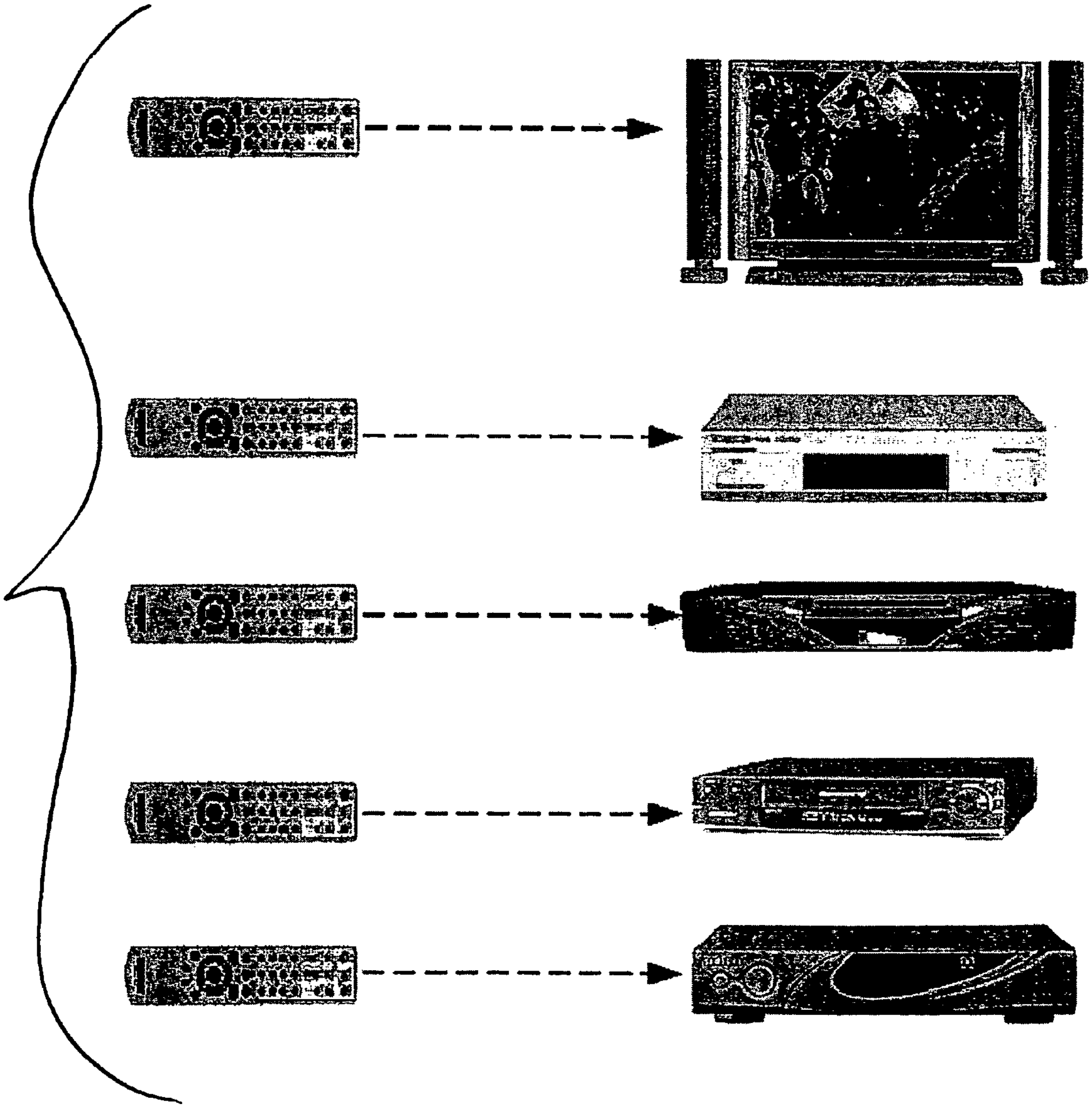
FIG. 1 is a view showing dedicated remote controls and slave devices in the art.
Figure 2:
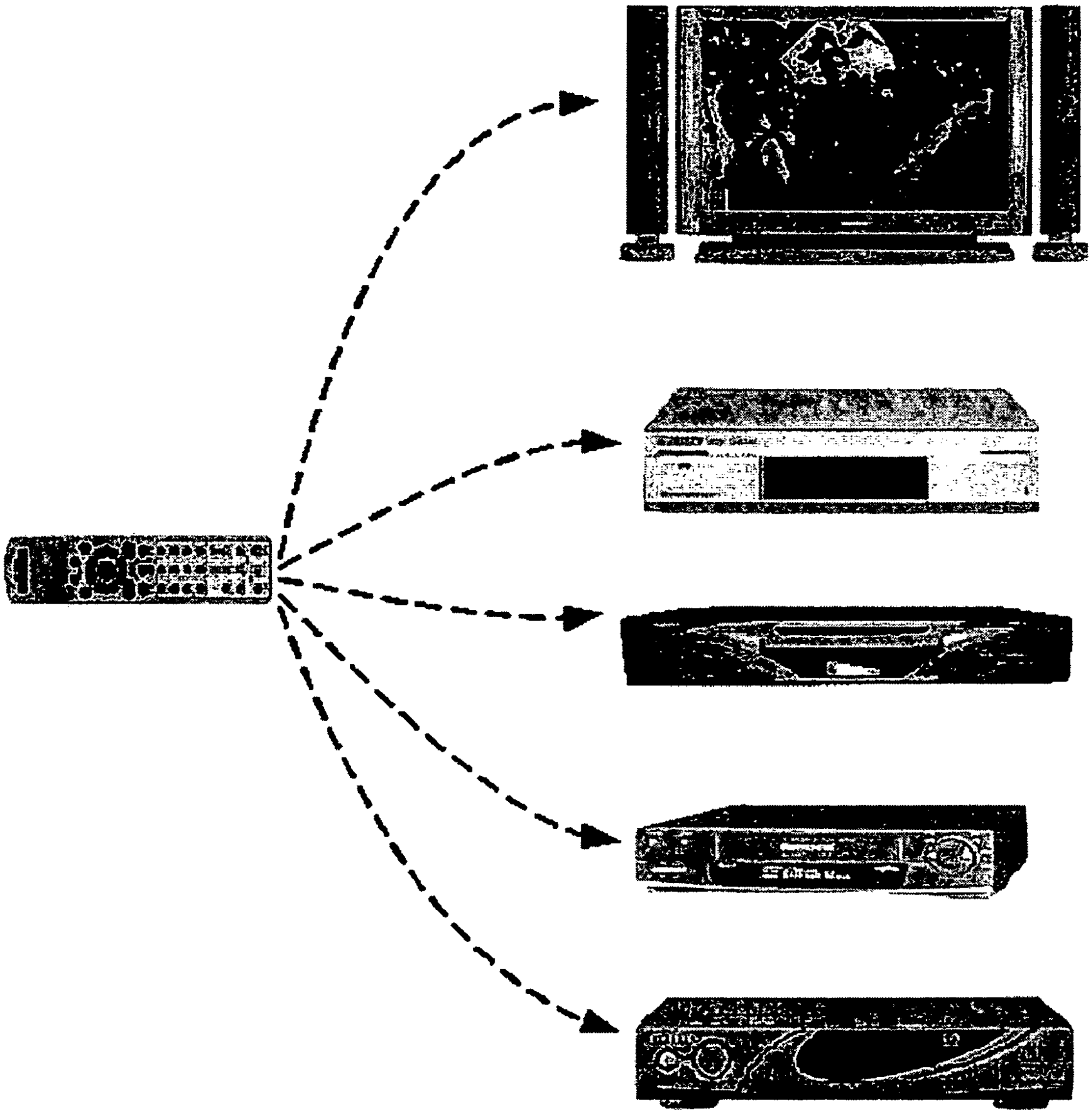
FIG. 2 is a view showing a universal remote control and slave devices in the art.
Figure 3:
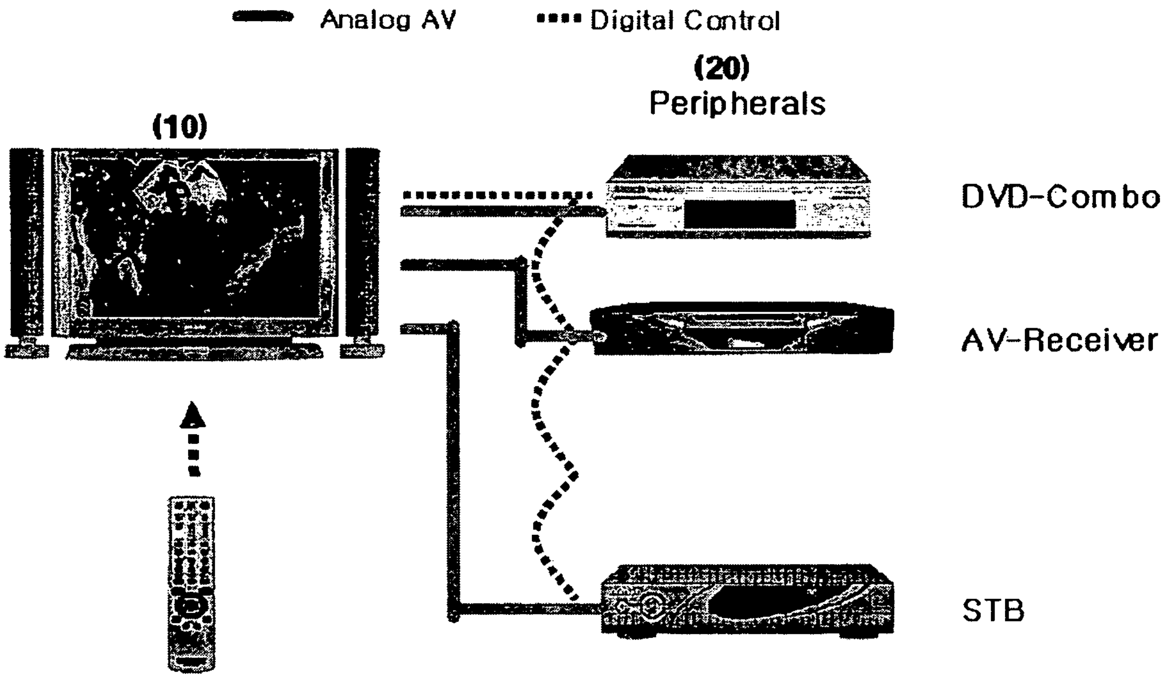
FIG. 3 is a view showing a remote control and control by a slave device by the remote control according to an exemplary embodiment of the present invention.

An embodiment of the present invention, as shown in FIG. 3, includes AV cables (indicated by solid lines) transmitting and receiving video or audio signals as well as communication control lines (indicated by dotted lines) using a separate protocol to transmit data packets, for example, IEEE 1394 connection lines, RS-232C cables, or the like. Over the control lines, device information, connection state information and the like of the AV devices may be transmitted and received and operation commands that can control the devices may be delivered.

Figure 4A:
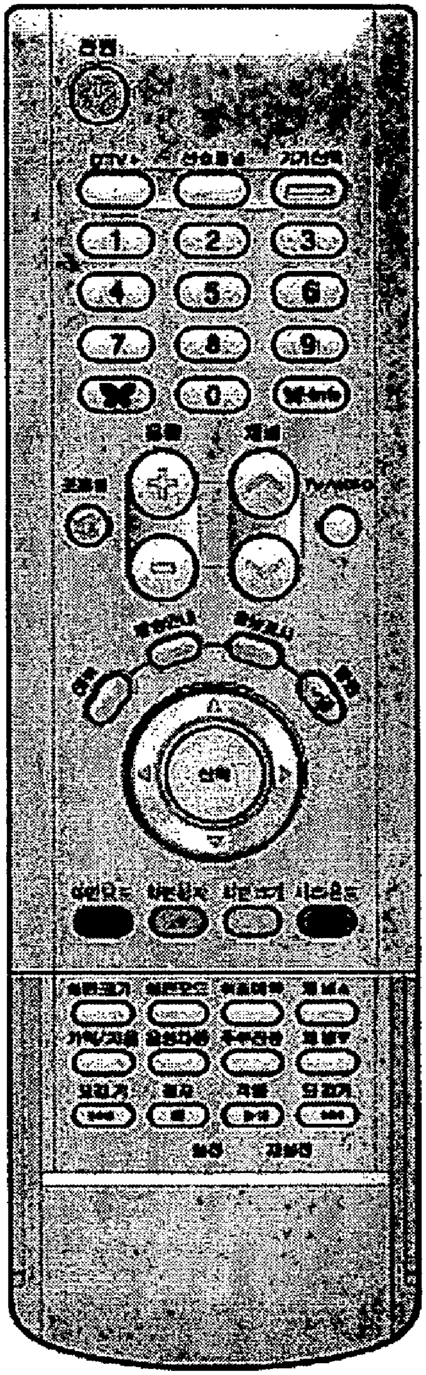
FIGS. 4A-E show exemplary embodiments of a remote control in accordance with the present invention.
Figure 4B:
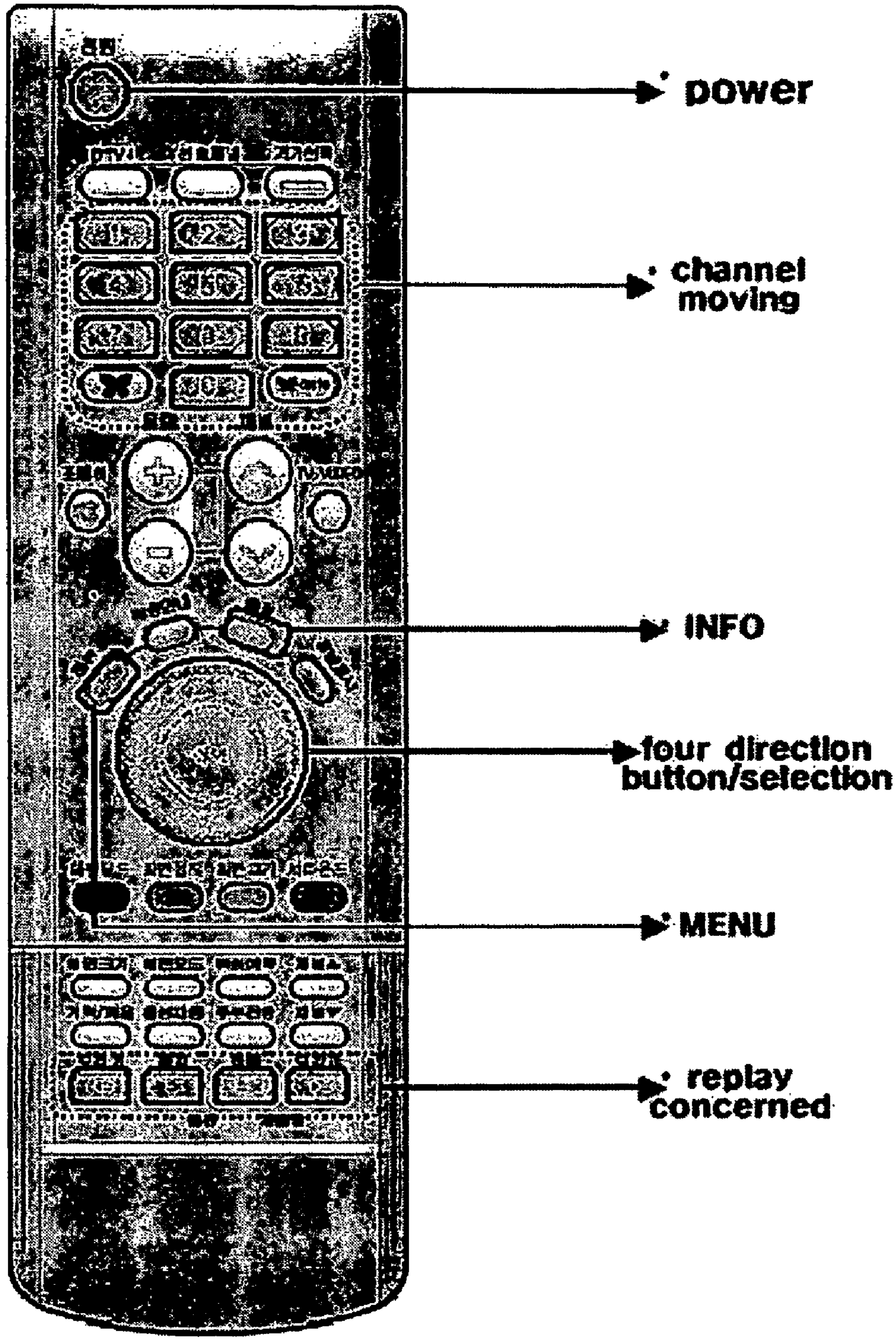
Figure 4C:
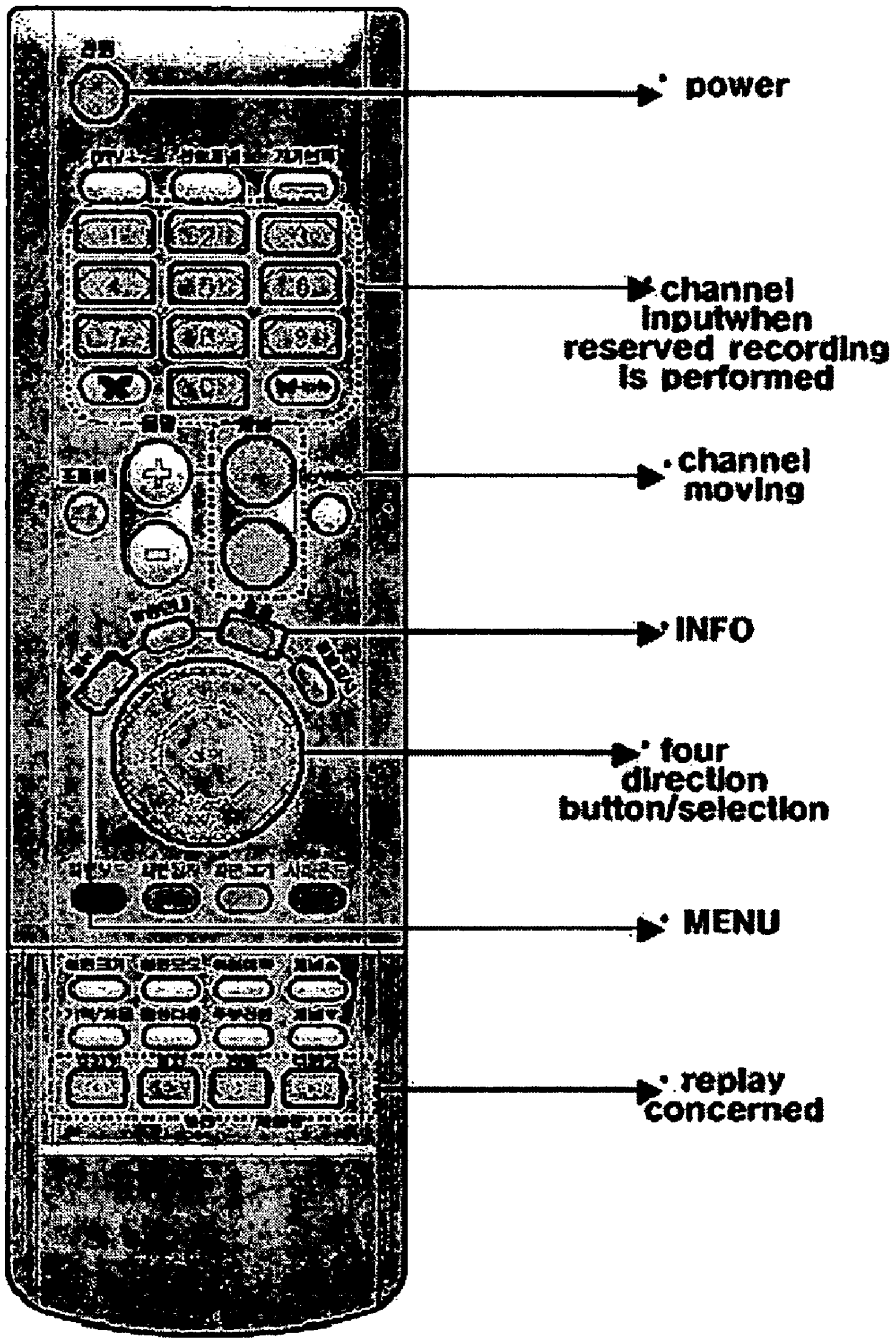
Figure 4D:
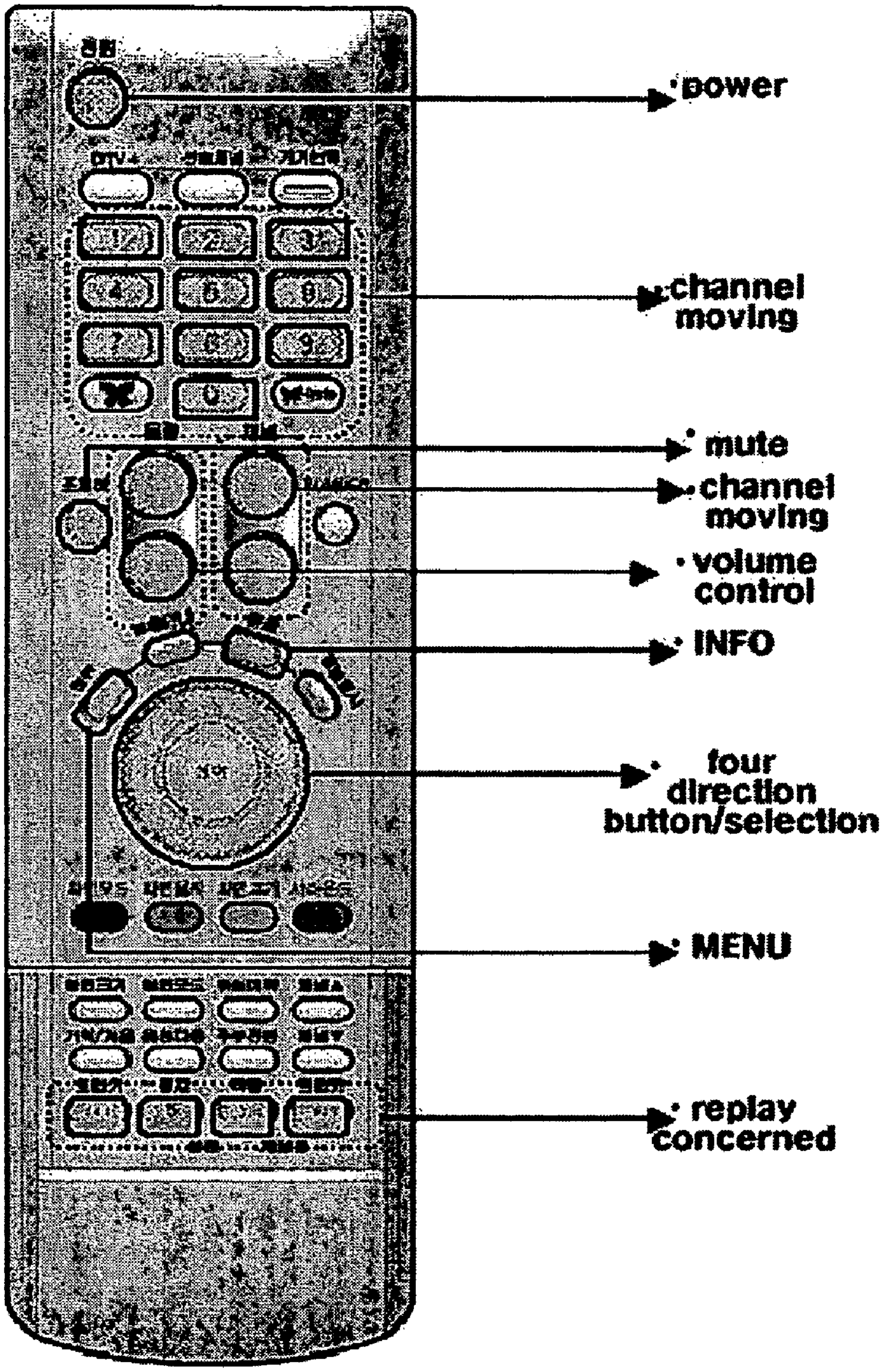
Figure 4E:
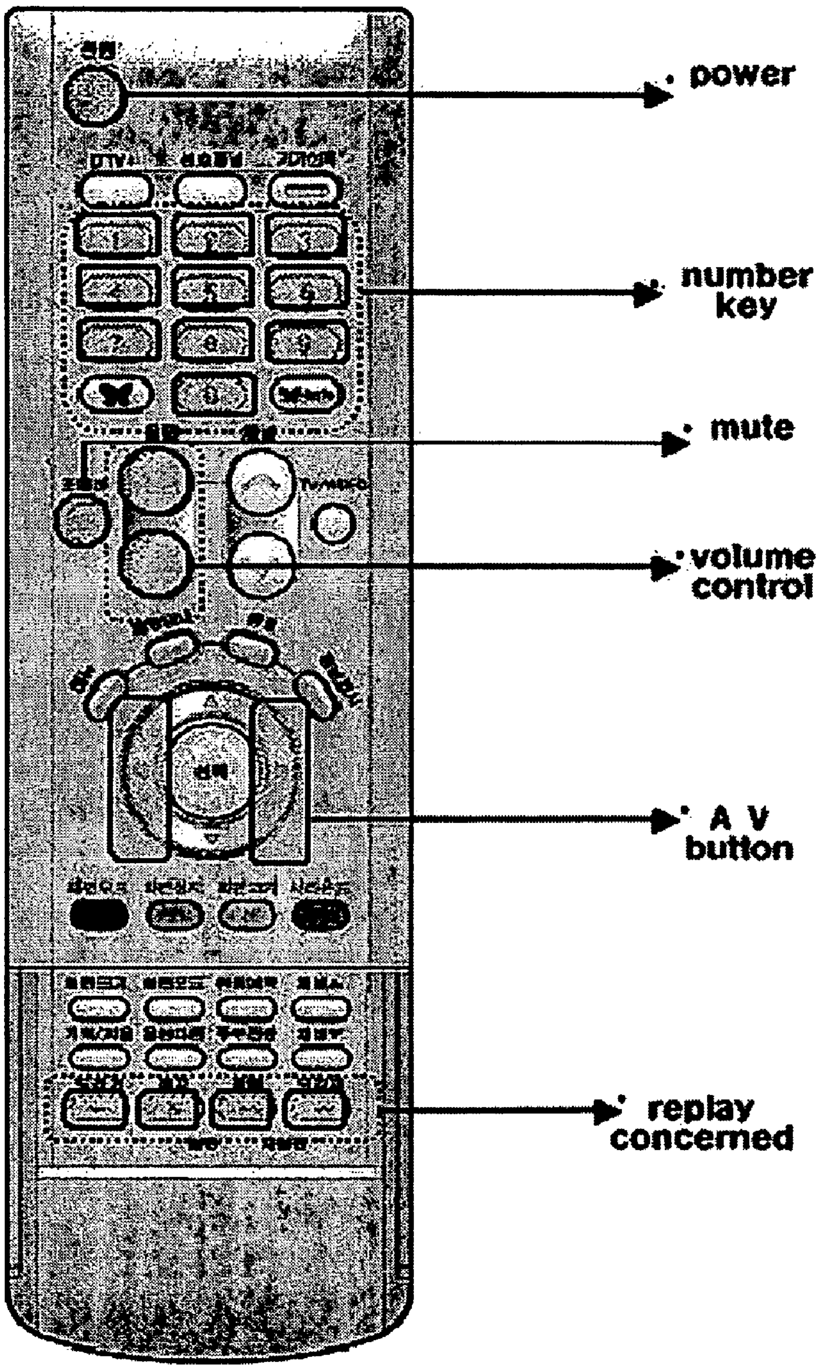

FIG. 4A to FIG. 4E show exemplary embodiments of a remote control in accordance with the present invention, wherein FIG. 4A shows a remote control for a general master device, FIG. 4B shows a remote control for a general master device with which DVD remote control functions are mapped, FIG. 4C shows a remote control for a general master device with which VCR remote control functions are mapped, FIG. 4D shows a remote control for a general master device with which STB remote control functions are mapped, and FIG. 4E shows a remote control for a general master device with which A/V-Receiver remote control functions are mapped.

In accordance with an aspect of the present invention, a remote control function for a specified device is added to a remote control function for a general master device so as to make it possible to control other slave device 20 using the remote control for the master device and to control each of the slave device 20 using one remote control without changing the remote control. Here, the remote control key of the master device 10 and the remote control key of the slave device 20 are commonly used and the master device 10 processes the remote control keys input according to states of the master device 10 and the slave device 20, so that each of the slave device 20 is controlled by the remote control for the master device 10.

As shown in the drawings, common keys used for the master device 10 and each of the slave devices 20 (DTV, DVD, STB, VCR and AV-Receiver) and separate keys used to control each of the master device 10 or the slave devices 20 can be established in the remote control key for the general master device. Here, the common keys are understood as remote control keys which can be used for the master device 10 and a plurality of slave devices 20, such as a volume control key and a channel selection key, and the separate keys are understood as remote control keys which are assigned for a specified device, such as a master device screen mode and a master device surround.

When the user selects the common keys, the master device 10 determines a process with respect to the common keys inputted according to states of the master device 10 and the slave devices 20. That is, in order that the user selects the common keys to allow the master device 10 to process a control of the master device 10 or the slave devices 20 according to a current state, the master device 10 has to hold information on the slave devices 20 to be controlled by the master device 10. Also, it is necessary to identify information on how each of the slave devices 20 is connected to the master device 10, for example, an input/output relationship of video signals, and an input/output relationship of audio signals on the basis of information on each of the slave devices. Finally, it is necessary to identify state information on a current operation state of each of the slave devices 20. The master device 10 performs a process for the common keys on the basis of the device information, connection information and state information of the slave devices 20.

Figure 5:
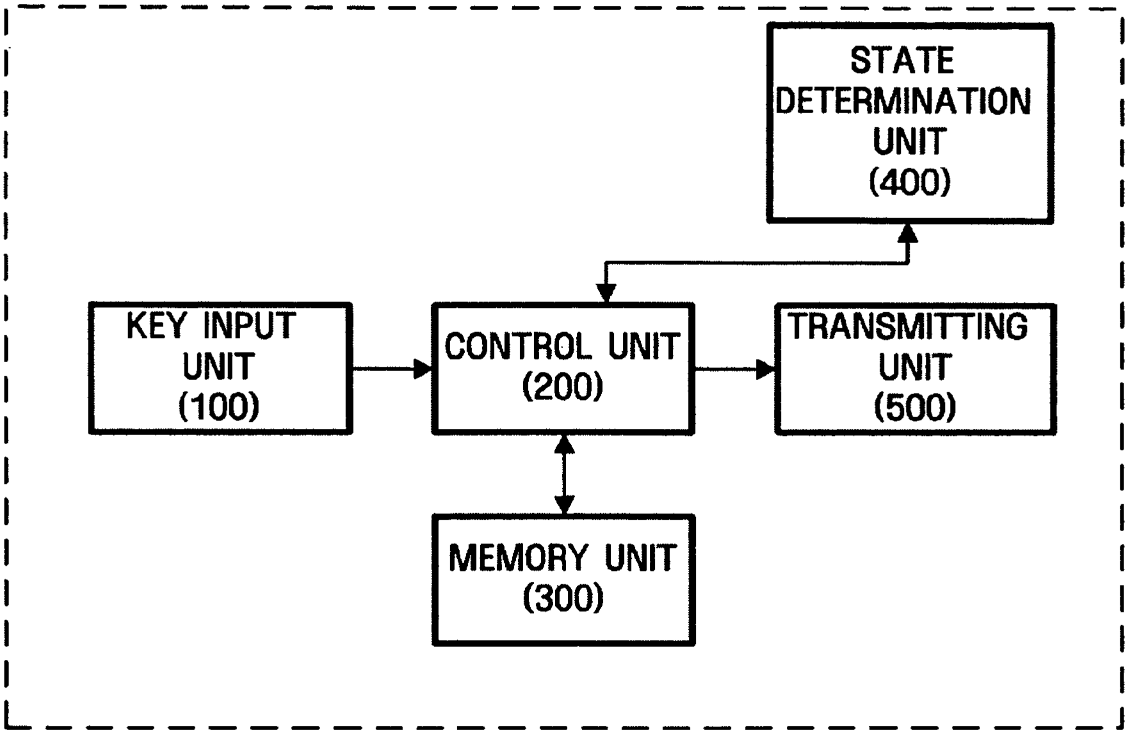
FIG. 5 is a schematic block diagram showing a control device for multiple slave devices in an integrated manner according an exemplary embodiment of the present invention.

FIG. 5 is a schematic block diagram showing a control device for multiple slave devices in an integrated manner according an exemplary embodiment of the present invention. Referring to this figure, the control device includes a key-input unit 100, a control unit 200, a memory unit 300, a state determination unit 400 and a transmitting unit 400. A user refers to information on slave devices 20 databased in the memory unit 300, and obtains information on a slave device 20 by selecting the device 20 among the devices in his/her possession. Accordingly, the present exemplary embodiment of the present invention requires no separate means for recognizing the slave device 200. Meanwhile, in order to establish device information and connection information on a slave device 20 by use of a list of slave devices databased in the memory unit 300, the user may determine a remote control key relative to the concerned slave device 20 by use of the list of the devices databased in the memory unit 300 or by direct input of the key through a predetermined user interface (UI).

The key input unit 100 is a means for receiving the key as input by the user. When the user selects the remote control key, the key input unit 100 receives a code value of the key selected by the user and transmits it to the transmitting unit 200

The state determination unit 400 checks information on states of slave devices 20. The state information herein refers to operational states of a television set (master device) 10 and slave devices 20.

The memory unit 300 stores therein device information and state information of the master device 10 and the slave devices 20, along with a mapping table for determining a slave device to which a control command is to be transmitted in response to a key input by the user and a control operation of the input key. The mapping table is generated based on device information on the slave devices 20 and a remote control of each slave device 20, which will be later described with reference to FIGS. 9A and B.

The control unit 200 is a means for interpreting the input key according to state information on the master device 10 and the slave devices 20 and performing a control to the concerned slave device 20. The control is performed based on the mapping table stored in the memory unit 300.

The transmitting unit 500 transmits a signal for a control operation determined by the control unit 200 to the concerned slave device 20. The signal may be transmitted through wireless communication or a predetermined wired network.

Figure 6:
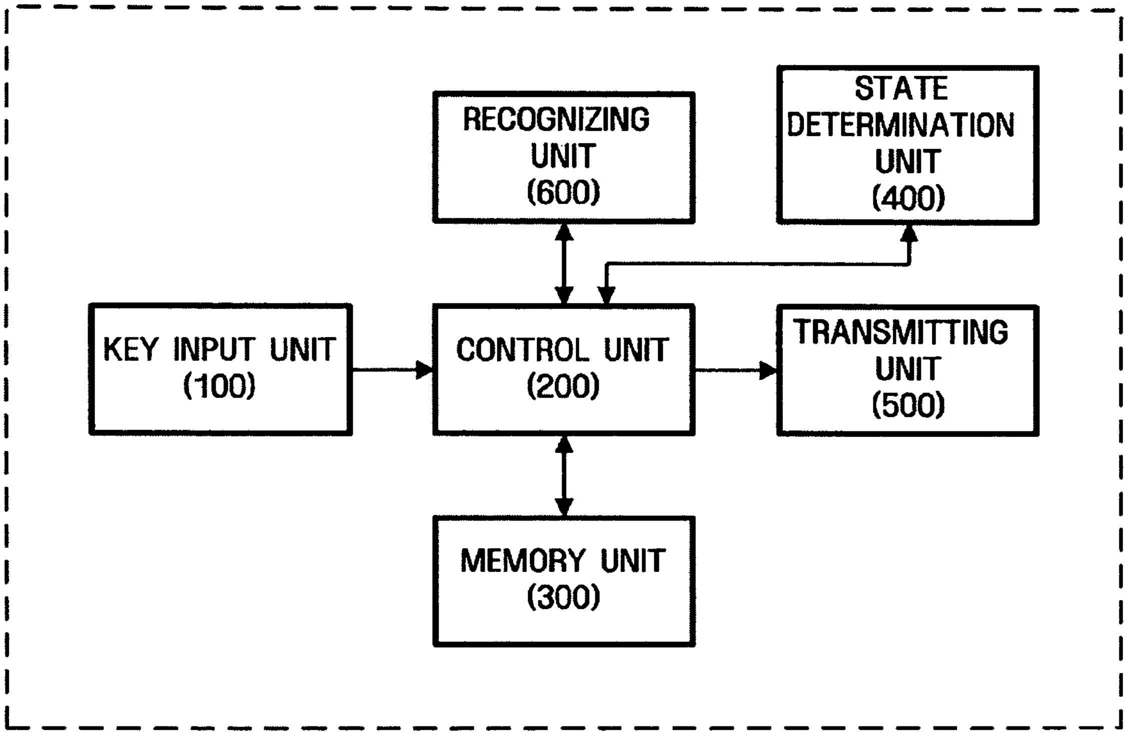
FIG. 6 is a schematic block diagram showing a control device for multiple slave devices in an integrated manner according another exemplary embodiment of the present invention.

FIG. 6 is a schematic block diagram showing a control device for multiple slave devices in an integrated manner according another exemplary embodiment of the present invention. Referring to this figure, the control device comprises a key input unit 100, a control unit 200, a memory unit 300, a state determination unit 400, a transmitting unit 400 and a recognizing unit 600. Differently from the control device illustrated in FIG. 5, the control device in FIG. 6 has the recognizing unit, which automatically identifies the slave devices 20 existing on the network. The control device in FIG. 5 lacks this feature.

The recognizing unit 600 checks device information and connection information of the slave devices existing on the network and functions to bring the remote control keys of the slave devices 20 in the memory of the master device 10 as necessary. In this case, the recognizing unit 600 inquires the slave device 20 about the remote control key thereof and the slave device 20 makes its own remote control key as a table for making the master device 10 understood and transmits the table to the master device 10. The network may use a variety of physical layers such as RS-232C, Ethernet, PLC (Power Line Communication), IEEE 1394 and the like.

In order to recognize information the slave devices existing on the network, the recognizing unit 200 allocates an ID to each of the slave device IDs. The slave device IDs may be allotted by either of two modes: one is to allot a fixed ID to each slave device and the other is to automatically allot an ID to the slave device by use of the network. A method for recognizing information on the slave devices 20 will be later described with reference to FIG. 7.

The device for controlling multiple slave devices 20 in an integrated manner according to an exemplary embodiment of the present invention may be constructed separately from the master device 10 or may be embedded inside a specific slave device 20 or the master device 10.

Figure 7A:
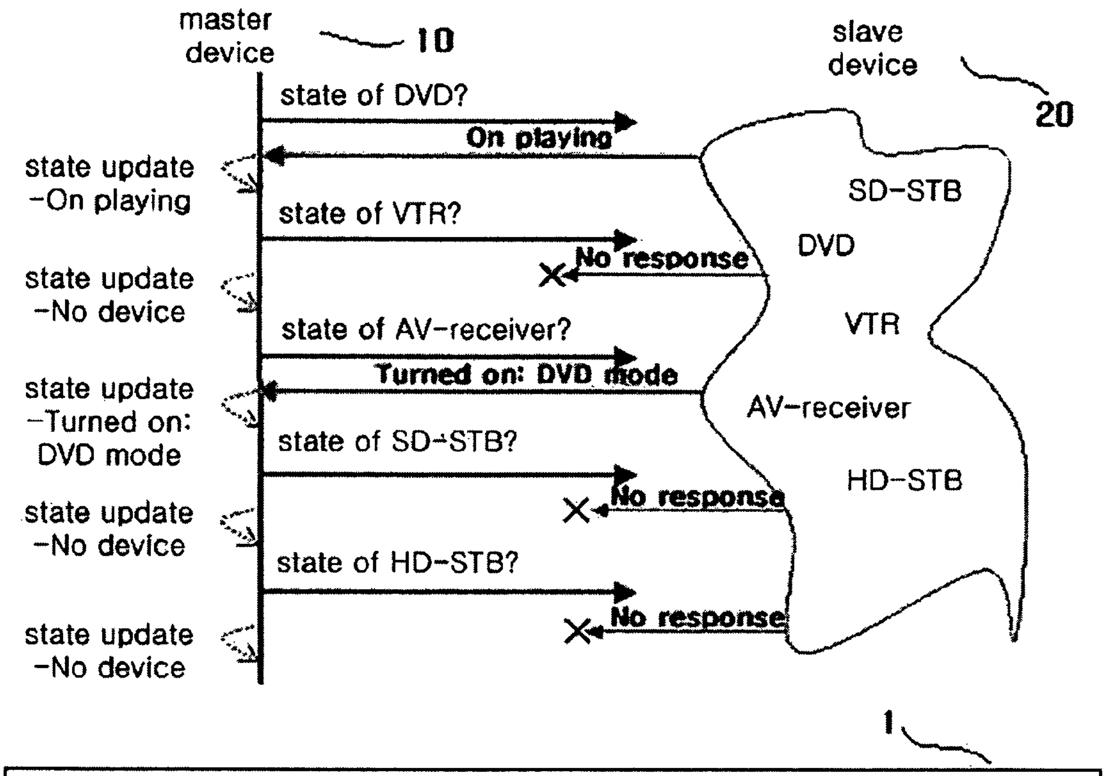

FIGS. 7A-C are views explaining a method for obtaining device information on a slave device on an recognizer unit side of FIG. 6, wherein FIG. 7A is a view explaining how a fixed ID is allocated to the slave device, FIG. 7B is a view explaining how an ID is automatically allocated to the slave device, and FIG. 7C is a view checking whether to delete a slave device on a network, with respect to automatic allocation of an ID to the slave device.

At first, referring to FIG. 7A illustrating allocation of a fixed ID to the slave device, there are shown slave device such as a DVD, a VTR, an A/V-Receiver on a network, and each of the slave devices is allocated a fixed ID as shown in Table 1.

TABLE 1

| Device | DVD | VTR | Combo | A/V-Receiver | SD-STB | HD-STB |
|---|---|---|---|---|---|---|
| ID | 0×01 | 0×02 | 0×03 | 0×04 | 0×05 | 0×06 |

With reference to FIG. 7A, the master device 10 asks each of the slave devices 20 about their respective states, and each of the slave devices 20 informs the master device 10 of its own state information. By doing so, the master device 10 can identify the slave devices 20 existing on the network based on responses from the slave devices 20, and the master device 10 can obtain an ID of each of the respective slave devices since the fixed ID has been allocated to each of the slave devices 20.

As illustrated in FIG. 7B, the method of automatically allocating IDs to slave devices 20 has been proposed to overcome a problem caused when, if a type of slave device 20 has a fixed ID, the IDs of multiple slave devices 20 overlap. For example, when an ID of a slave device 20 is fixed and there are two DVDs, this case could not be solved. However, this problem may be solved by automatically allocating device IDs since the overlapping devices in existence are recognized as different, thereby allowing the user to use them in a different manner.

Among the automatic allocation methods, a method of allocating IDs with a separate buffer control circuit will first be described. The buffer control circuit is used to disconnect a lower network to thereby enable communication to only one device in the process of allocating IDs to the devices. That is, communication to the lower network may be disconnected by allowing a device which desires to be allocated an ID to disable its buffer 30 so that only the master device 10 and the device communicate and a unique ID can be allocated to the device.

To describe this method with reference to Program 2 as illustrated in FIG. 7B, when the master device 10 transmits a command to disable to buffers of all the slave devices 20 existing on the network, only the slave device 20 connected directly to the master device 10 can communicate with the master device 10. Accordingly, the master device 10 communicates with only one first slave device 20 and allocates an ID to the first slave device 20 in communication.

Then, the master device 10 transmits a command to enable a buffer 30 of the slave device 20 allocated an ID. The slave device 20 allocated the ID enables its own buffer 30 to thereby allow the master device 10 to communicate with a second slave device connected to the lower network.

In order to know which slave devices 20 have not been allocated IDs, the master device 10 transmits a packet ("Who are you"; referred to as "A packet") requesting unique identification information to the devices 20 and the slave devices having no IDs are only allowed to send a response packet ("Who I am"; referred to as "B packet"). By doing so, the master device 10 allocates new IDs to those slave devices having no IDs.

The slave device allocated a new ID enables its own buffer 30 for a third slave devices connected to the lower network. Through this method, multiple slave devices are allocated IDs, and only one slave device that has not been allocated an ID can communicate with the master device 10.

Thereafter, when the master device allocates an ID to the last slave device and there are no slave devices not allocated IDs, the process of allocating IDs on the master device 10 side to slave devices existing on the whole network is terminated.

Meanwhile, a master device should always check addition or deletion of slave devices 20 on the network. A method of determining deletion of a slave device on the network will first be described with reference to Program 3 as illustrated in FIG. 7C.

As shown in this figure, the network connected through an RS-232C cable updates the state of the network by a user's request or under a requirement of the master device 10, when the network is used. At this time, state information on the slave device 20 that is already registered (or allocated ID) is reflected. However, when there is no response from the slave device 20, it is determined that the slave device 20 has been deleted, and the corresponding ID of the slave device 20 is deleted from a list.

Next, a method to determine whether a new slave device has been added on the network will be explained. The master device 10 on the network connected through the RS-232C cable cannot identify automatically whether the new slave device 20 has been added. Therefore, in order to identify whether the new slave device 20 has been added, it should be confirmed whether any slave device 20 allocated no ID exists on the network. Here, since several slave devices 20 cannot be registered simultaneously, the slave device 20 having no ID disables the buffer, and the slave device 20 having an ID enables the buffer. That enables unregistered slave devices to be registered one by one.

However, when a new slave device 20 added to the current network has been allocated an ID by another network, there may be a problem that the slave device 20 cannot be controlled on the current network, and another problem that the master device cannot control the new slave device 20 when the ID allocated to the slave device is currently allocated to another slave device. Therefore, it is desirable to newly construct the whole network when a new slave device 20 is added, in RS-232C network.

Figure 8A:
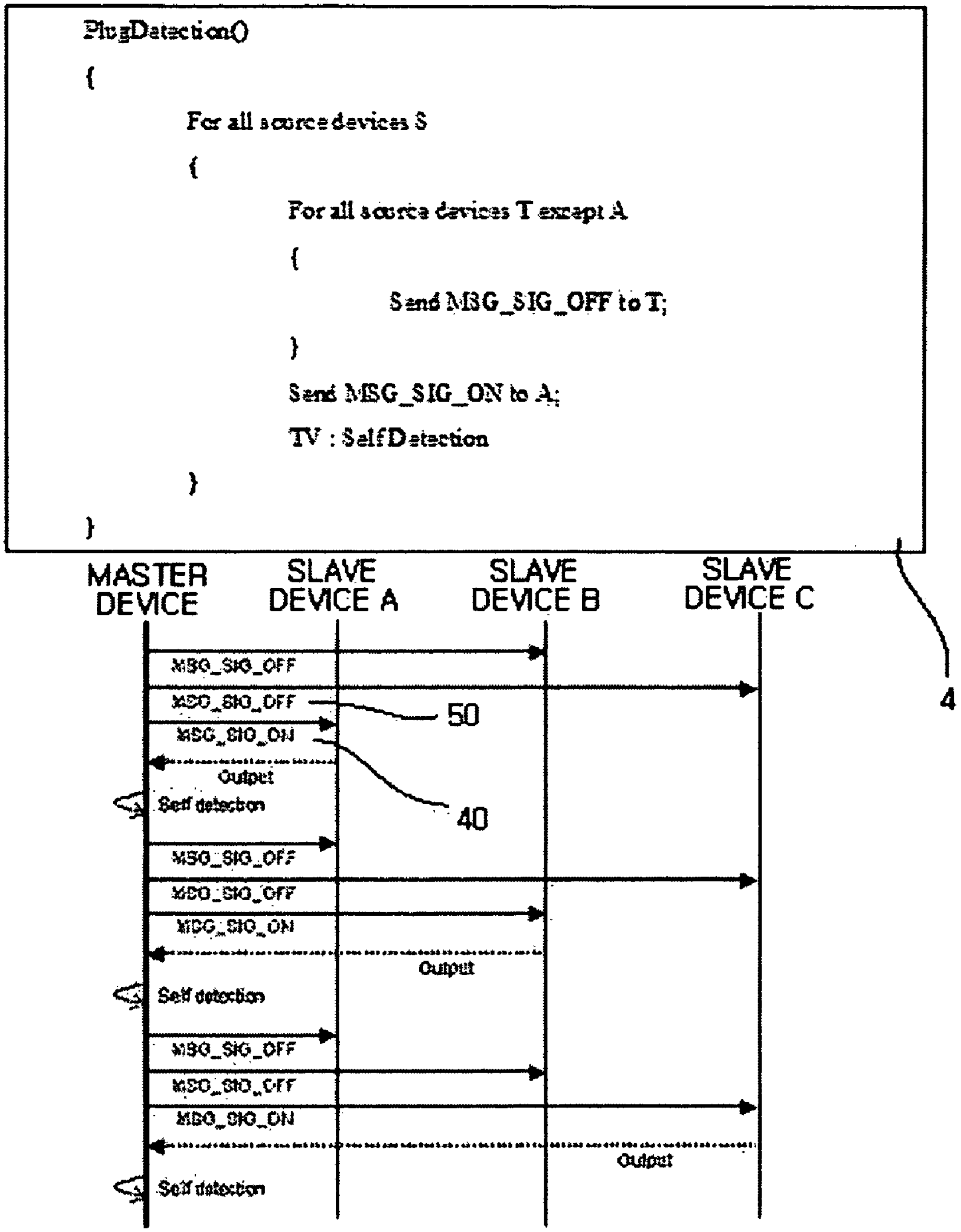
FIGS. 8A and B are views explaining a method for obtaining connection information on a slave device on a recognizer unit side of FIG. 6.
Figure 8B:
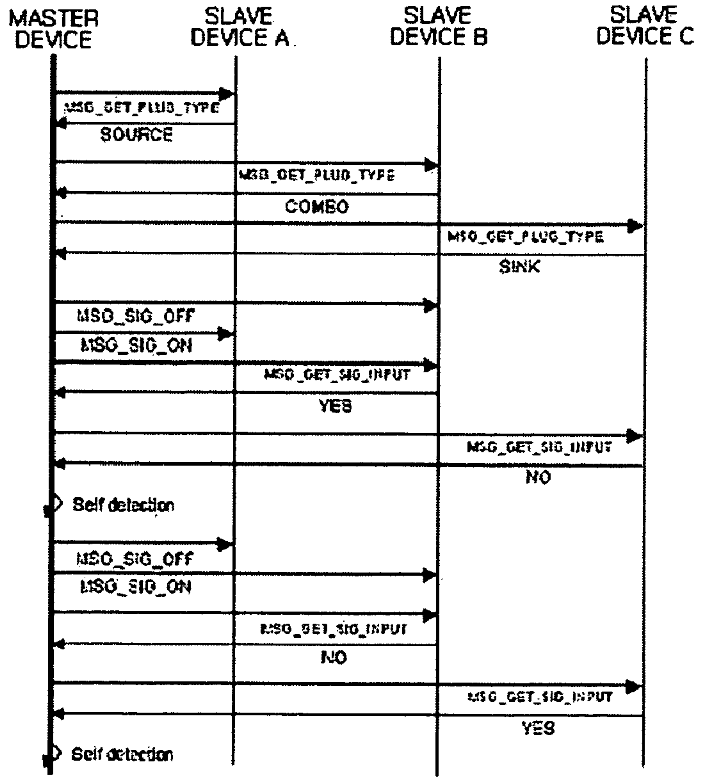

FIGS. 8 and B are views explaining a method for obtaining connection information on a slave device on an recognizer unit side of FIG. 6 wherein FIG. 8A explains a method of inspecting only an external input to the master device and FIG. 8B explains a method of inspecting a relation of external input/output to various devices besides the master device. Since the recognizing unit 600 inspects connection information, the master device 10 can obtain current connection information of the slave device 20 to the master device 10 and other slave devices 20. Through this process, the master device 10 can control the concerned slave device 20.

FIG. 8A explains a method of inspecting only an external input to the master device. Assuming that all the slave devices 20 participating in the network are source devices each having only an output plug, the output plugs of all the slave devices 20 are connected to the master device 10 and the master device can know the connection by inspecting connection configuration between the slave devices 20 one by one.

Referring to Program 4 of FIG. 8A and a genealogy as illustrated, the master device 10 turns on signals of the slave devices named A, B and C in sequence and inspects to which external input of the master device each of the slave devices is connected. The master device 10 transmits signals of MSG_SIG_ON 40 and MSG_SIG_OFF 50 to each of the slave devices through the network, and each slave device switches on or off its output signals according to the transmitted signals. If the signals of MSG_SIG_ON 40 and MSG_SIG_OFF 50 are not supported by the slave devices because of a command to switch on/off the output signals themselves, inspection of the slave device connections can be simply implemented through power on/off. That is, power supply to the slave devices is turned off, the slave device does not output the signals but power supply thereto is turned on, the slave device outputs its own signals. Accordingly, the master device 10 can obtain connection information relative to each of the slave devices.

FIG. 8B explains a method of inspecting a relationship of external input/output to various devices besides the master device. There may exist multiple slave devices, in addition to the source device on the network, which need to be considered when constructing a network including an input/output device (Combo Device) having both input/output plugs, an input device (Sink Device) having the input plug only, and an isolated Device having no input/output plugs. Since the isolated device only support network controls, and it has no input/output plugs, it is not necessary to identify a state of AV cable connection between devices: for this reason, it will not be considered.

With reference to the illustrative drawings, the master device 10 examines the plug types of all slave devices 20 existing on the network and determines only output devices and input/output devices which are to be examined. Then, remaining outputs except one of slave devices having the output plugs are powered off. Also, in order to find out where the one slave device to be outputted is input, a connection state of the plug is identified by searching for input devices and input/output devices having the input plugs.

For example, when each of the output device, input device and input/output device is connected to the master device 10, the master device 10 first identifies the input/output types of all the slave devices 20 on the network, and then makes only one of slave device among slave devices having the output plugs to be outputted and the remaining slave devices not to be outputted.

Next, a current connection state is identified by making a query whether any signal is currently being input into the slave devices having the input plugs. Assuming that slave device A refers to an output device, slave device B refers to an input/output device, and slave device C refers to an input device, only the slave device A is outputted and the slave device B is not output, and then the current connection state is identified by making a query whether any signal is currently being input into the slave devices B and C having the input plugs Through these processes, it is understood that an output of the slave device A is connected to an input of the slave device B and an output of the slave device B is connected to an input of the slave device C.

FIGS. 9A and B show a mapping table in accordance with the present invention, wherein FIG. 9A indicates a mapping table when an external input comprises a DVD combo, and FIG. 9B indicates a mapping table when an external input comprises a STB. Control operations according to the state information of the slave device 20 are established in the mapping table, so that the slave device 20 can be controlled according to the established control operation when a user's key code value is input.

To describe a method of making a mapping table, a process of obtaining device information on slave devices 20 is first performed. To obtain the device information of the slave devices existing on the network, IDs are automatically allocated to the slave devices by use of the network. Otherwise, a user refers to device information on the slave devices 20 databased in the memory unit, among which the user selects the devices in his/her possession.

Connection information between slave devices is identified, that is, how the slave devices 20 are currently connected to other slave devices including the master device 10 is identified.

Accordingly, a mapping table based on device information on the slave devices 20 or connection information therebetween is generated.

Figure 10:
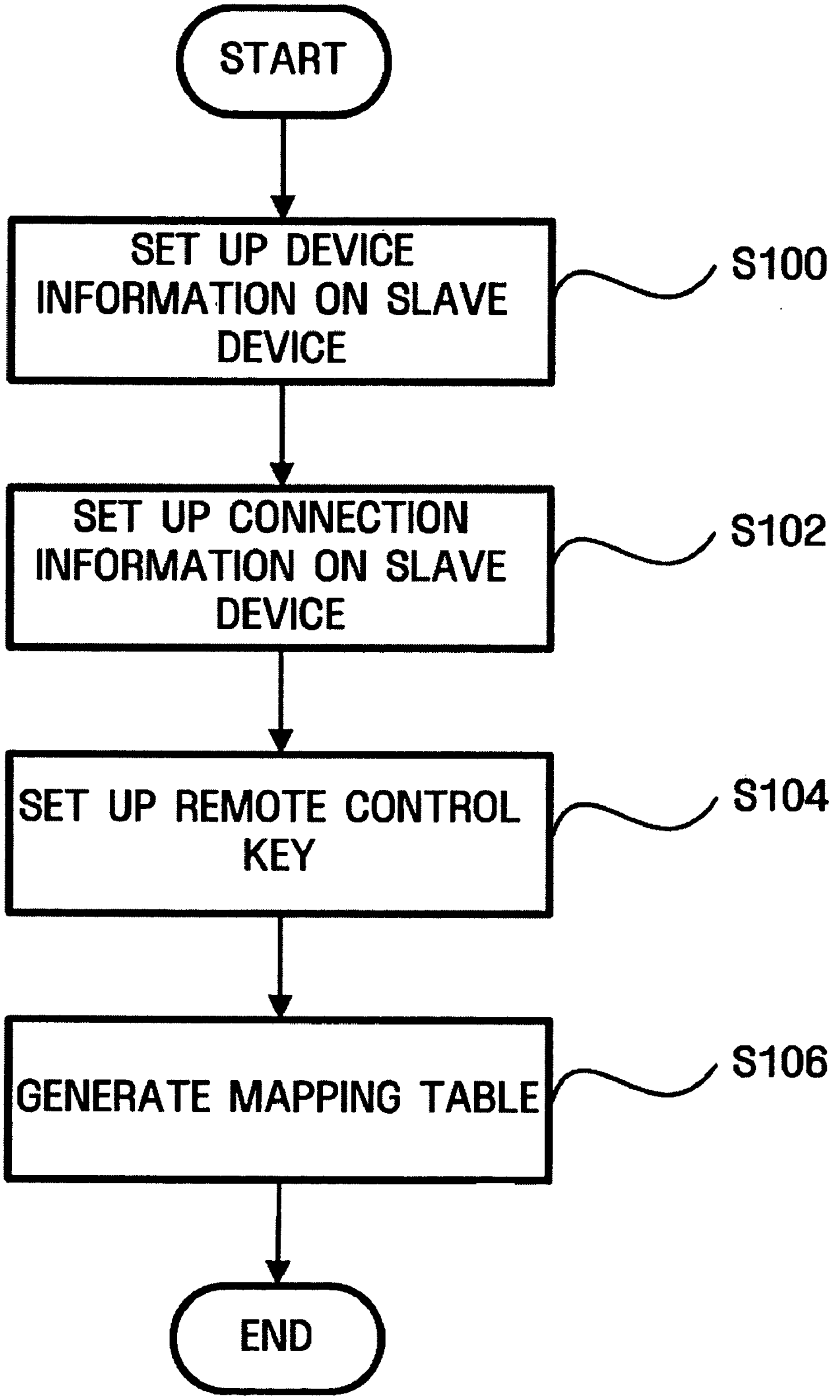
FIG. 10 is a flow chart schematically showing the initial process to control multiple slave devices according to an exemplary embodiment of the present invention.

FIG. 10 is a flow chart schematically showing the initial process to control multiple slave devices according to an exemplary embodiment of the present invention. To control operations of slave devices 20, device information on the slave devices 20 existing on the network or those databased in the memory unit 300 is obtained (S100).

Connection information to know how the slave devices 20 are currently connected to other slave devices including the master device 10 is identified based on the obtained device information (S102), and remote control keys according to each of the slave devices 20 are set up (S104).

A mapping table is then generated based on device information and connection information of the slave devices as collected (S106). The mapping table includes control commands by device generated based on the device information or connection information.

Steps S100 to S104 may be implemented according to direct selection by the user of the list of slave devices 20 stored in the memory unit 300 or may be implemented automatically by the recognizing unit 600.

Figure 11:
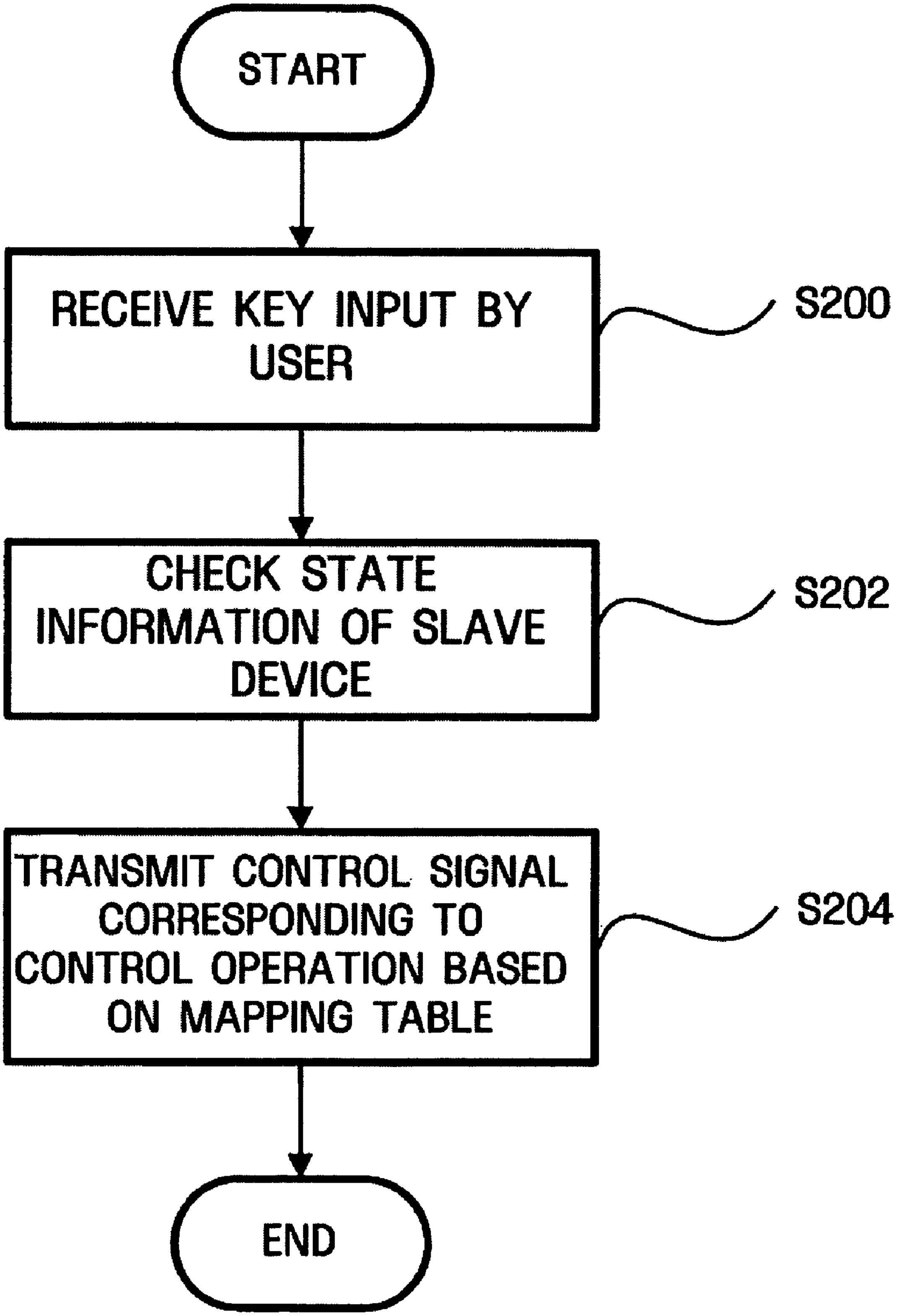
FIG. 11 is a flow chart showing a method to control multiple slave devices according to an exemplary embodiment of the present invention.

FIG. 11 is a flow chart showing a method to control multiple slave devices according to an exemplary embodiment of the present invention. The key input unit 100 receives a key input by the user (S200) and the control unit 200 checks state information of the slave devices 20 according to the key input by the user (S202). The control unit 200 searches for the key code value according to the input key in the mapping table. The state information of the slave device to be considered in the concerned key code value is identified and, accordingly, a control command is extracted.

Then, the control unit 200 transmits the extracted control command to the transmitting unit 500 (S204) whereby it is possible to control the concerned slave device 20 having received the control command as transmitted.

Figure 12:
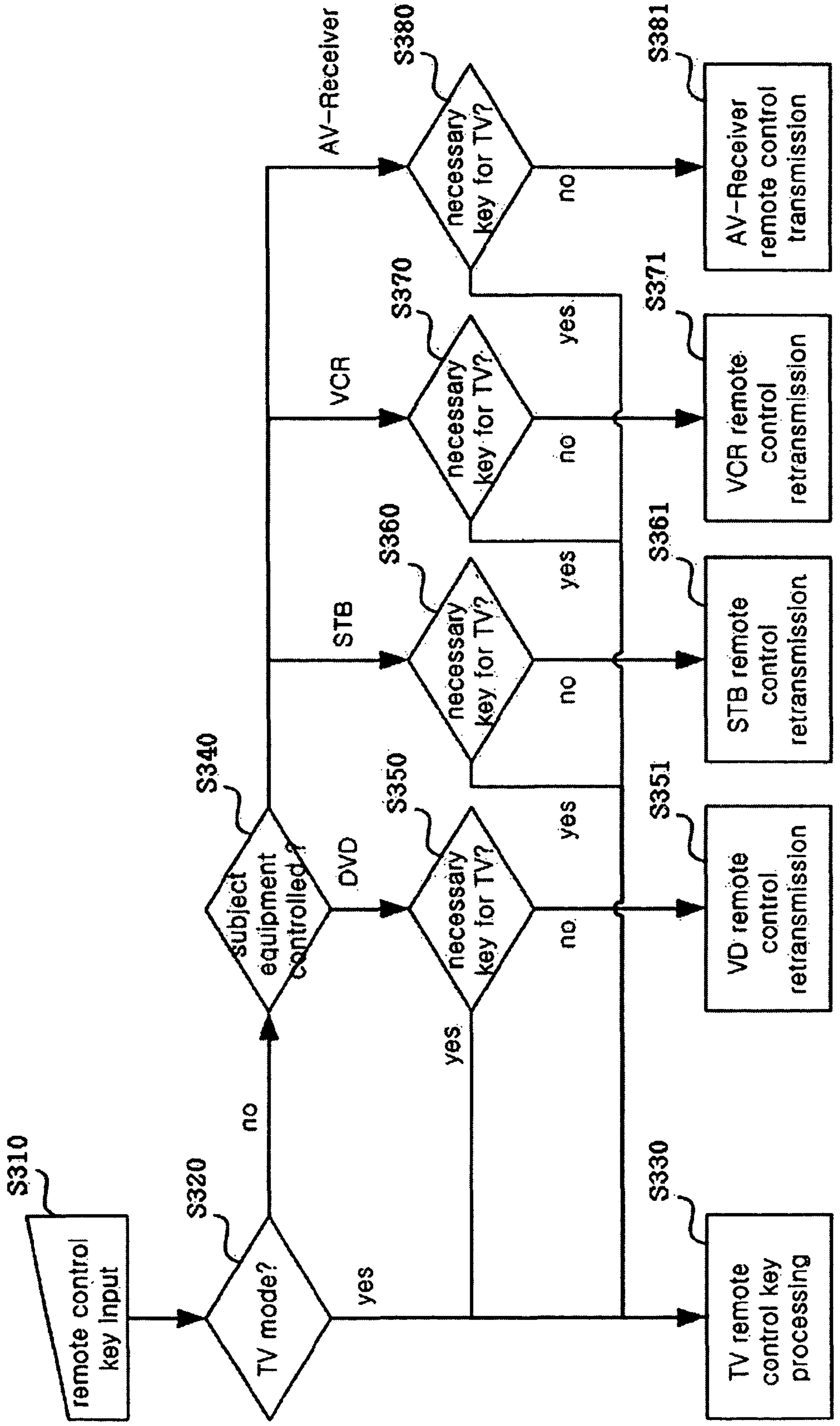
FIG. 12 is a flow chart showing how to control all devices using a remote control.

FIG. 12 is a flow chart showing how to control all devices using a remote control. Slave devices are allocated device identifications (IDs) after detecting slave devices, and the TV receives a predetermined key code input by a remote control through a remote control key receiving unit 100 of the TV (S310). Next, when the TV is currently in an execution mode, that is, in a TV broadcasting execution mode (Yes in S320), the operation of the TV corresponding to the key code is controlled by processing the key code of the remote control (S330). If the TV is in no TV broadcasting execution mode (No in S320), it is detected which slave device 20 transmitting a signal to the current TV is subjected to control S340 and the operation of the TV or the slave device 20 is controlled according to the mapping table of the slave device 20. Assuming that the slave device 20 refers to a DVD, a VCR, a STB, or otherwise an A/V-Receiver in this exemplary embodiment, when the slave device 20 refers to the DVD and an operation corresponding to the key code in the mapping table of FIG. 9A is performed in the TV, a user interface of the TV is displayed and a user input is received (S350). If the operation is performed in the DVD, the retransmission is made by the DVD remote control and the operation of the DVD corresponding to the key code is controlled (S351).

Assuming that the slave device 20 refers to the STB (Set Top Box), when an operation corresponding to the key code in the mapping table shown in FIG. 9B is performed in the TV, the user interface of the TV is indicated and the user input is received S360. If the operation is performed in the DVD, the retransmission is made by the DVD remote control and then the operation of the slave device 20 corresponding to the key code is controlled (S361).

The VCR and A/V-Receiver also follow the same process as in the DVD and STB.

Although the preferred embodiments and drawings of the present invention have been disclosed for illustrative purposes, those skilled in the art appreciate that various substitutions, modifications, changes and additions are possible, without departing from the scope and spirit of the invention as disclosed in the accompanying claims.

What is claimed is:

1. A device for controlling multiple slave devices, comprising:

an input unit that receives an input by a user;

a state determination unit that checks state information of the slave devices;

a recognizing unit that automatically allocates identification to the slave devices and checks connection information comprising information on how the slave devices are connected;

a control unit that interprets the input to determine that the input is directed toward controlling a slave device which is to be controlled among the slave devices based on the state information, identification, and connection information of each of the slave devices, and controls the slave device which is to be controlled; and an external input unit that receives external connections from the slave devices, wherein the information on how the slave devices are connected comprises information indicating to which external input of the external input unit each of the slave devices is connected.

2. The device as claimed in claim 1, wherein the control unit controls the slave device which is to be controlled based on a mapping table in which slave devices and control operations of the slave devices are determined according to the state information of the slave devices and keys input by the user.

3. The device as claimed in claim 2, wherein the slave device which is to be controlled is controlled by transmitting a control signal corresponding to a control operation stored in the mapping table to the slave device which is to be controlled by use of wireless telecommunication.

4. The device as claimed in claim 1, wherein the recognizing unit checks device information and the connection information of the slave devices existing on the network.

5. The device as claimed in claim 1, wherein the key input received by the input unit is a common key which can be directed toward controlling any of the slave devices.

6. A display device for controlling multiple slave devices, comprising:

a control device, the control device comprising:

an input unit that receives a key input by a user;

a state determination unit that checks state information of the slave devices and the display device;

a recognizing unit that automatically allocates identification to the slave devices and checks connection information comprising information on how the slave devices are connected; and a control unit that interprets the input to determine that the input is directed toward controlling a slave device which is to be controlled among the slave devices based on the state information of each of the slave devices and the display device and on the identification and the connection information of each of the slave devices, said control unit controlling the slave device which is to be controlled; and an external input unit that receives external connections from the slave devices, wherein the information on how the slave devices are connected comprises information indicating to which external input of the external input unit each of the slave devices is connected.

7. The display device as claimed in claim 6, wherein the control unit controls the slave device which is to be controlled based on a mapping table in which slave devices and control operations of the slave devices are determined according to the state information of the slave devices and keys input.

8. The display device as claimed in claim 7, wherein the slave device which is to be controlled is controlled by transmitting a control signal corresponding to a control operation stored in the mapping table to the slave device which is to be controlled by use of wireless telecommunication.

9. The display device as claimed in claim 6, wherein the recognizing unit checks device information and the connection information of the slave devices existing on the network.

10. The display device as claimed in claim 6, wherein the key input received by the input unit is a common key which can be directed toward controlling any of the slave devices.

11. A method for controlling multiple slave devices comprising:

receiving a key input by a user;

checking state information of the slave devices existing on a network;

automatically allocating identification to the slave devices;

checking connection information of the slave devices, said connection information comprising information on how the slave devices are connected;

receiving data from the slave devices input through external connections of a master controller device; and controlling a slave device which is to be controlled among the slave devices by interpreting the input to determine that the input is directed toward controlling the slave device based on the state information of each of the slave devices and on the identification and the connection information of each of the slave devices, wherein the information on how the slave devices are connected comprises information indicating to which external input of the master controller device each of the slave devices is connected.

12. The method as claimed in claim 11, wherein the state information includes information on a signal input into a display device.

13. The method as claimed in claim 11, the controlling the slave device comprising controlling the slave device which is to be controlled based on a mapping table in which the slave devices and control operations of the slave devices are determined according to the state information of the slave devices and keys input by the user.

14. The method as claimed in claim 13, wherein the mapping table is generated by:

collecting device information of the slave devices existing on the network;

collecting connection information of the slave devices based on the collected device information of the slave devices; and setting up a remote control key to be provided to the slave device which is to be controlled based on the collected device information and the connection information.

15. The method as claimed in claim 14, wherein the device information and the connection information of the slave devices are collected by collecting a list of the slave devices stored in a memory unit by the user.

16. The method as claimed in claim 14, wherein the device information and the connection information of the slave devices are obtained by automatically collecting information on the slave devices existing on the network.

17. The method as claimed in claim 14, wherein collection of the device information on the slave devices existing on the network comprises:

transmitting to each slave device of the slave devices existing on the network a packet to request unique identification information of each of the respective slave devices;

receiving a response packet to the request packet from a predetermined slave device that has not been allocated with a device identification ID;

allocating a device identification ID to the predetermined slave device that transmitted the response packet; and collecting the device information of the slave device based on the device identification ID allocated.

18. The method as claimed in claim 14, wherein collection of the connection information between the slave devices based on the collected device information of the slave devices comprises:

activating multiple slave devices sequentially; and collecting the connection information of the activated slave devices wherein the control unit controls the slave device based on a mapping table in which the slave devices and control operations of the slave devices are determined according to state information of the slave devices and keys input by the user.

19. The method as claimed in claim 14, wherein collection of the connection information of the slave devices based on the collected device information of the slave devices comprises:

ascertaining each slave device of the slave devices having an output plug and an input plug;

activating each slave device of the slave devices having an output plug sequentially; and ascertaining each slave device of the slave devices that receives an output of the activated slave devices through the input plug.

20. The method as claimed in claim 11, wherein received key input is a common key which can be directed toward controlling any of the slave devices.

* * * * *